Dec. 2, 1969 J. D. HUGHSON ET AL 3,482,046

NON-SYNCHRONOUS RADIO COMMUNICATION SYSTEM AND METHOD

Filed April 4, 1963 8 Sheets-Sheet 1

INVENTORS
J.D. HUGHSON AND
C.E. SCHWAB

BY Forest B. Hitchcock

THEIR ATTORNEY

NON-SYNCHRONOUS RADIO COMMUNICATION SYSTEM AND METHOD

Filed April 4, 1963 8 Sheets-Sheet 2

INVENTORS
J.D. HUGHSON AND
C.E. SCHWAB
BY Forest B. Hitchcock
THEIR ATTORNEY

Dec. 2, 1969 J. D. HUGHSON ET AL 3,482,046

NON-SYNCHRONOUS RADIO COMMUNICATION SYSTEM AND METHOD

Filed April 4, 1963 8 Sheets-Sheet 3

INVENTORS
J. D. HUGHSON AND
C. E. SCHWAB

BY Forest B. Hitchcock
THEIR ATTORNEY

INVENTORS
J. D. HUGHSON AND
C. E. SCHWAB
BY Forest B. Hitchcock
THEIR ATTORNEY

INVENTORS
J. D. HUGHSON AND
C. E. SCHWAB
BY Forest B. Hitchcock
THEIR ATTORNEY

INVENTORS
J.D. HUGHSON AND
C.E. SCHWAB
BY Forest B. Hitchcock
THEIR ATTORNEY

FIG. 6A

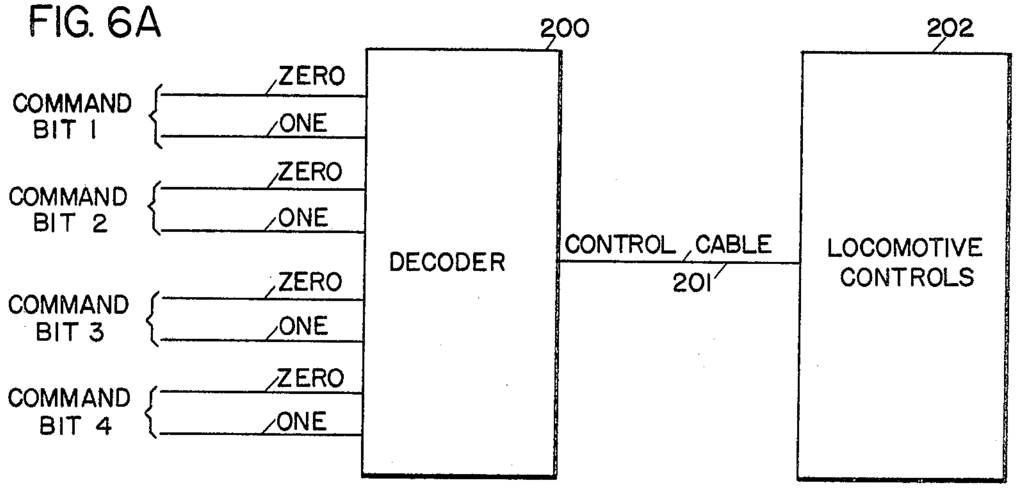

FIG. 6B

| LOCOMOTIVE COMMAND CODE CHART | | | | |
|---|---|---|---|---|
| COMMAND BITS | | | | LOCOMOTIVE FUNCTION |
| 1 | 2 | 3 | 4 | |
| 0 | 0 | 0 | 0 | FORWARD |
| 0 | 0 | 0 | 1 | REVERSE |
| 0 | 0 | 1 | 0 | THROTTLE DOWN ONE STEP |
| 0 | 0 | 1 | 1 | COAST |
| 0 | 1 | 0 | 0 | INDEPENDENT BRAKE APPLICATION |
| 0 | 1 | 0 | 1 | INDEPENDENT BRAKE RELEASE |
| 0 | 1 | 1 | 0 | BELL CONTROL |
| 0 | 1 | 1 | 1 | SAND CONTROL |
| 1 | 0 | 0 | 0 | HORN CONTROL |
| 1 | 0 | 0 | 1 | HEADLIGHT CONTROL |
| 1 | 0 | 1 | 0 | THROTTLE ADVANCE ONE STEP |
| 1 | 0 | 1 | 1 | GRADUATED AUTOMATIC BRAKE APPLICATION |
| 1 | 1 | 0 | 0 | (SPARE CHANNEL) |
| 1 | 1 | 0 | 0 | (SPARE CHANNEL) |
| 1 | 1 | 1 | 0 | (SPARE CHANNEL) |
| 1 | 1 | 1 | 1 | AUTOMATIC BRAKE STOP |

INVENTORS
J.D. HUGHSON AND
C.E. SCHWAB
BY Forest B. Hitchcock
THEIR ATTORNEY

INVENTORS
J.D. HUGHSON AND
C.E. SCHWAB
BY Forest B. Hitchcock
THEIR ATTORNEY 3,482,046
Patented Dec. 2, 1969

3,482,046

NON-SYNCHRONOUS RADIO COMMUNICATION SYSTEM AND METHOD

J Donald Hughson, Rochester, and Carl E. Schwab, Farmingdale, N.Y., assignors to General Signal Corporation, Rochester, N.Y., a corporation of New York Filed Apr. 4, 1963, Ser. No. 270,751
Int. Cl. H04j 3/02
U.S. Cl. 179—15 19 Claims This invention relates to radio communication systems, and more particularly to a method and apparatus for accommodating a plurality of communicated messages on a single carrier frequency with a minimum of interference between messages contemporaneously transmitted from a plurality of transmitters to their respective individual receivers.

In many present-day industrial and transit operations, use of remote control can greatly speed production, or decrease costs for the same production. Use of radio to provide a communication link between the operator and controlled apparatus allows great flexibility of operation. Moreover, most industrial and transit operations require many operators, in order to separately control many pieces of apparatus. Thus, a system for permitting such plurality of operations by radio can have wide utility, since use of radio frees the controlled apparatus from the necessity of direct electrical contact with the transmitter. One desirable application for such system is encountered when operators must be isolated from operations which they control, as is the case in handling radioactive materials, for example.

Another desirable application arises in railroad train control, wherein use of remotely controlled locomotives to move cars can definitely increase production. However, present-day remotely controlled locomotives require one operator for each locomotive; moreover, several locomotives must often operate in the same general area. For these reasons, it has heretofore been deemed impractical to use radio control for operating the locomotives operating on a common frequency. One solution to this problem would be to use a number of radio frequencies in the system, employing a separate frequency for control of each individual locomotive. However, because the radio spectrum is highly utilized throughout the world, the necessary plurality of frequencies can rarely be allocated to a single user.

Another proposed system for eliminating interference problems on a single radio channel is that of using a common carrier frequency for control of all receiving stations, but with a group of different modulating frequencies assigned to each transmitter-receiver combination. However, this method requires more modulating frequencies than can readily be put on one carrier frequency if more than two or three transmitter-receiver combinations are used in the system. In addition, continuous transmission causes considerable carrier interference.

The present invention proposes to utilize a single frequency for communications between a plurality of transmitter-receiver combinations sharing time with the other transmitter-receiver combinations in a multiplexing scheme. In the proposed system, a particular transmitter is on the air for but a fraction of a second; for example, about 0.1 second in each second. This leaves the remaining time in each second, approximately 0.9 second, for other transmissions to take place without interference from the first transmitter. The individual transmitters are not in any way connected, and therefore are not synchronized, unlike conventional multiplex systems.

If two transmitters are transmitting to their respective receivers at the same time and proximity between transmitters and receivers is such as to cause interference, each receiver must reject the information received in order to avoid an erroneous operation. Under these circumstances, if the pulse repetition rate of transmission is the same for all transmitters, continuous interference can result. To avoid this condition, the pulse repetition rate of each transmitter is made random in time. Moreover, to provide essentially continuous communication, each pulse of a given transmitter occurs within specified time limits from the preceding pulse; for example, between 0.5 and 1.5 seconds from the preceding pulse.

Because each receiving station must respond to only one transmitter, it is necessary to provide an address so that each receiving station can recognize only a message sent from its associated transmitter. In the proposed system, the address is composed of a group of modulating frequencies superimposed on the pulses of carrier frequency.

In most industrial and transit operations where it is contemplated to utilize the proposed system, fail-safety is a prerequisite to incorporation of a radio control system. Thus, a lack of communications must be interpreted as a stop command. This requires that continuous, or nearly continuous communications between the transmitting and receiving stations must be maintained. Moreover, an improper or jumbled message must also be interpreted as a stop command. A jumbled message may occur when two or more transmitters are located such that a receiver receives signals from both transmitters equally well. Under these conditions, such receiving station must provide a stop command. However, although fail-safety exists under these circumstances, the interruption of work resulting from a stop command each time a jumbled message is received would make the use of a radio remote control system impractical. To avoid this situation, the present invention requires loss of communications for a specified duration, before providing a stop command. If, for example, two consecutive pulses are skipped or received with improper or jumbled information carried thereon, a stop command is produced. However, random time spacing of the pulses makes it extremely rare that two consecutive pulses from a single transmitter are interfered with.

Frequency modulated communications are known to exhibit a "capture effect." This effect permits control of a receiver with the strongest signal reaching the receiver antenna substantially without interference from other transmissions on the same frequency but of lesser power at the receiver antenna. Assuming all transmitters in the system to have equal power outputs, the "capture effect" then permits control of a receiving station from the closest transmitter without interference from other transmitters operating on the same carrier frequency but located at a greater distance from the receiver. Therefore, when transmitting and receiving stations are constantly being moved, only when the single transmitting station intended to control the receiving station is at a greater distance from its receiver than an interfering transmitter, can the capture effect cause the interfering transmitter to block the signal intended for the receiving station. Thus, by use of random pulse multiplexing and the "capture effect" of frequency modulation, substantially interference-free operation results. Moreover, as will be pointed out, the system is so arranged that a signal from an interfering transmitter cannot operate the receiver even during the rare instances when the interfering transmitter blocks the signal intended for the receiving station.

Another beneficial effect due to use of frequency modulation is that the transmitted signal is received free from atmospheric disturbances. This avoids noise in the received signal which otherwise might cause undesired stopping of the controlled apparatus, with its attendant inconvenience.

In order to provide a high degree of fail-safety in the ability of a receiving station to distinguish between a message intended for transmission to it and some other message, both an address and a command always contain the same number of modulating frequencies. Each receiving system checks all receptions to ascertain that all its required address frequencies are present, and that the remaining address frequencies, not required in its address, are not present. Thus, a triple check is used, i.e., proper number of address frequencies, proper address frequencies present, and improper address frequencies absent.

In addition to containing the proper address frequencies, each message must also comprise a specific number of command frequencies. Consequently, if a receiver detects more command frequencies than are assigned to the command code, it rejects the entire transmission, as it also does in the event one or more command frequencies are missing.

If the receiving system detects the proper address and a proper command, it then opens an AND gate, allowing the system to check on the modulating frequencies comprising the command signal. If the proper number of command frequencies and their combinations are present in accordance with certain conditions as determined by the system, the overall command is accepted as legitimate. Again however, if the number of command frequencies is not proper, or if there are in proper combinations of command frequencies, the command is rejected. The command frequencies are used for controlling the remotely operated equipment at the receiving station.

Accordingly, one object of the invention is to provide a method and apparatus for simultaneous communications between a plurality of transmitter-receiver pairs on a single or common carrier frequency.

Another object is to provide a communication system wherein communicated information is contained in pulses spaced randomly in time, each pulse comprising a burst of carrier frequency with superimposed modulating frequencies.

Another object is to provide a fail-safe system of radio control whereby a predetermined number of consecutively received pulses containing an improper signal produces a stop command.

Another object is to provide a system for randomly keying a frequency modulated transmitter.

Another object is to provide a radio receiving station for operating remotely controlled equipment in accordance with received command signals wherein the command signals are not applied to the controlled equipment unless a proper address is also present in the received signal.

Another object is to provide a multiplex communication system wherein transmitter-receiver pairs operate simultaneously on the same carrier frequency in a time-sharing basis without the necessity of synchronizing signals.

Another object is to provide a radio binary code communication system wherein ONES and ZEROS are each represented by modulating signals of predetermined frequencies.

Another object is to provide a receiving station for receiving coded information wherein an internal check is provided to assure absence of improper address signals as well as presence of proper address signals in the received information as a prerequisite to coupling command signals to utilization equipment.

The invention contemplates a communication system having means for generating pulses recurring at random times within periods of predetermined maximum and minimum limits. A transmitter is keyed with the output of the generating means and means modulates the output of the transmitter with first and second groups of frequencies. A composite signal containing the first and second groups of modulating frequencies is received by remote means and the first and second groups are separated from the composite signal. Gating means responsive to the second group of modulating frequencies is controlled by means responsive to the presence of the first group of modulating frequencies.

Further contemplated by this invention is a method of communicating information from a transmitter to a receiver. Randomly recurring pulses are generated and modulated with information in the form of two groups of modulating frequencies. The modulated pulses are transmitted to a receiver and checked for the presence of a predetermined number of modulating frequencies in one group of the modulating frequencies and an output code in accordance with the predetermined frequencies in the other group of modulating frequencies is provided when the predetermined number of modulating frequencies is present.

The foregoing and other objects and advantages of the invention will become apparent from the following detailed description when read in conjunction with the accompanying drawings, in which.

Figures 2, 7:
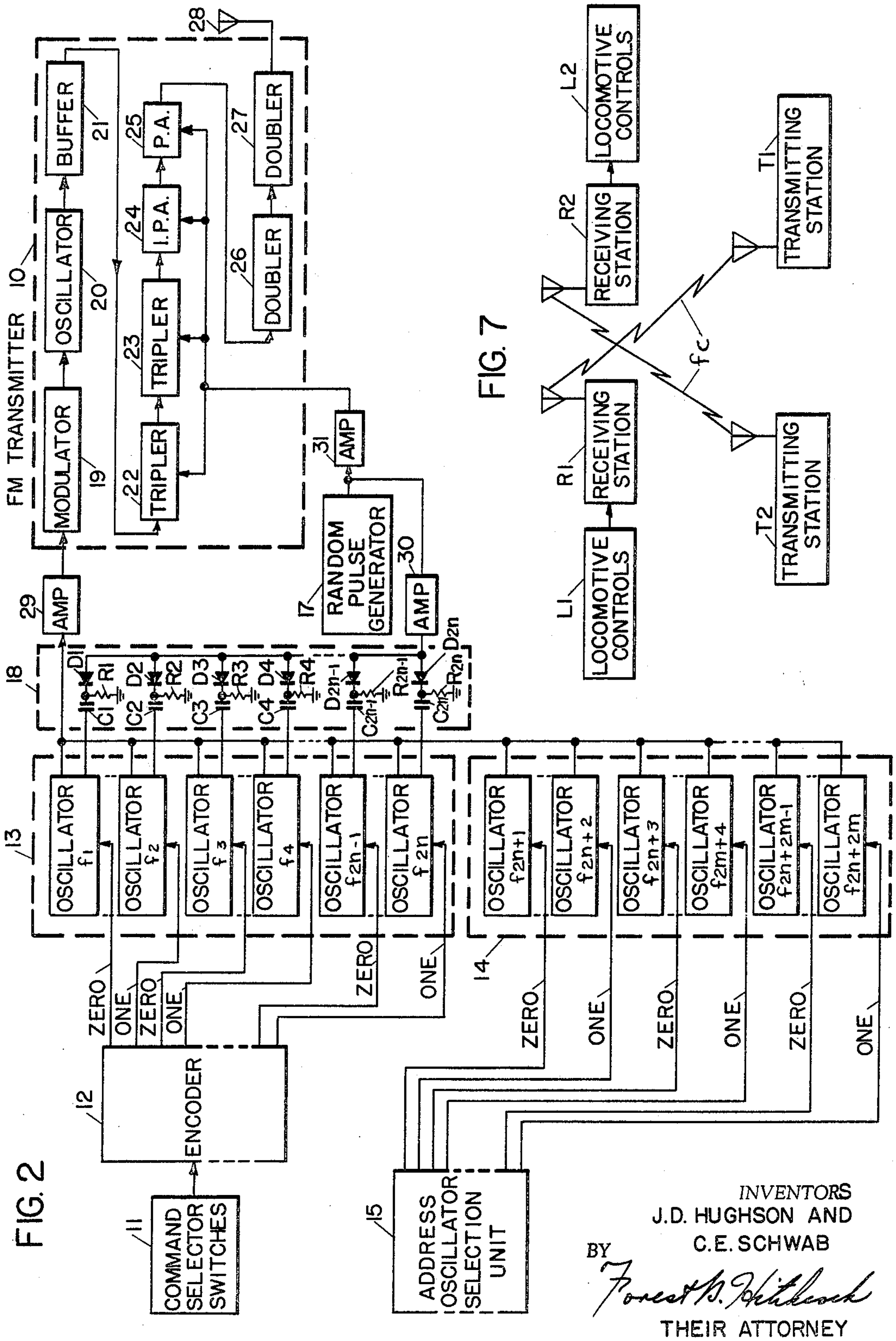
FIG. 2 is a functional block diagram of the transmitting station showing the oscillator and transmitter portions of the system in greater detail.
Figure 4A:
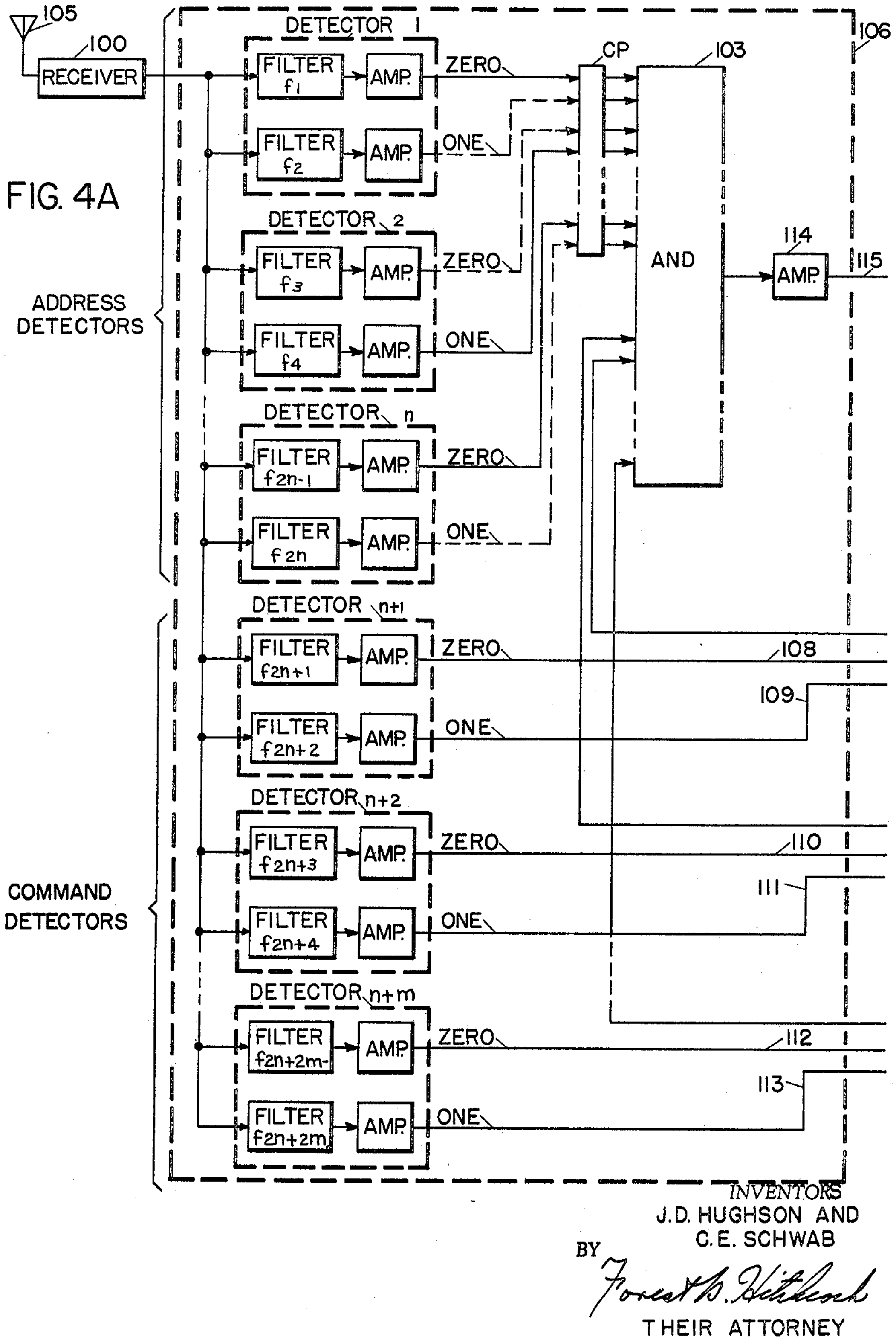
Figure 4B:
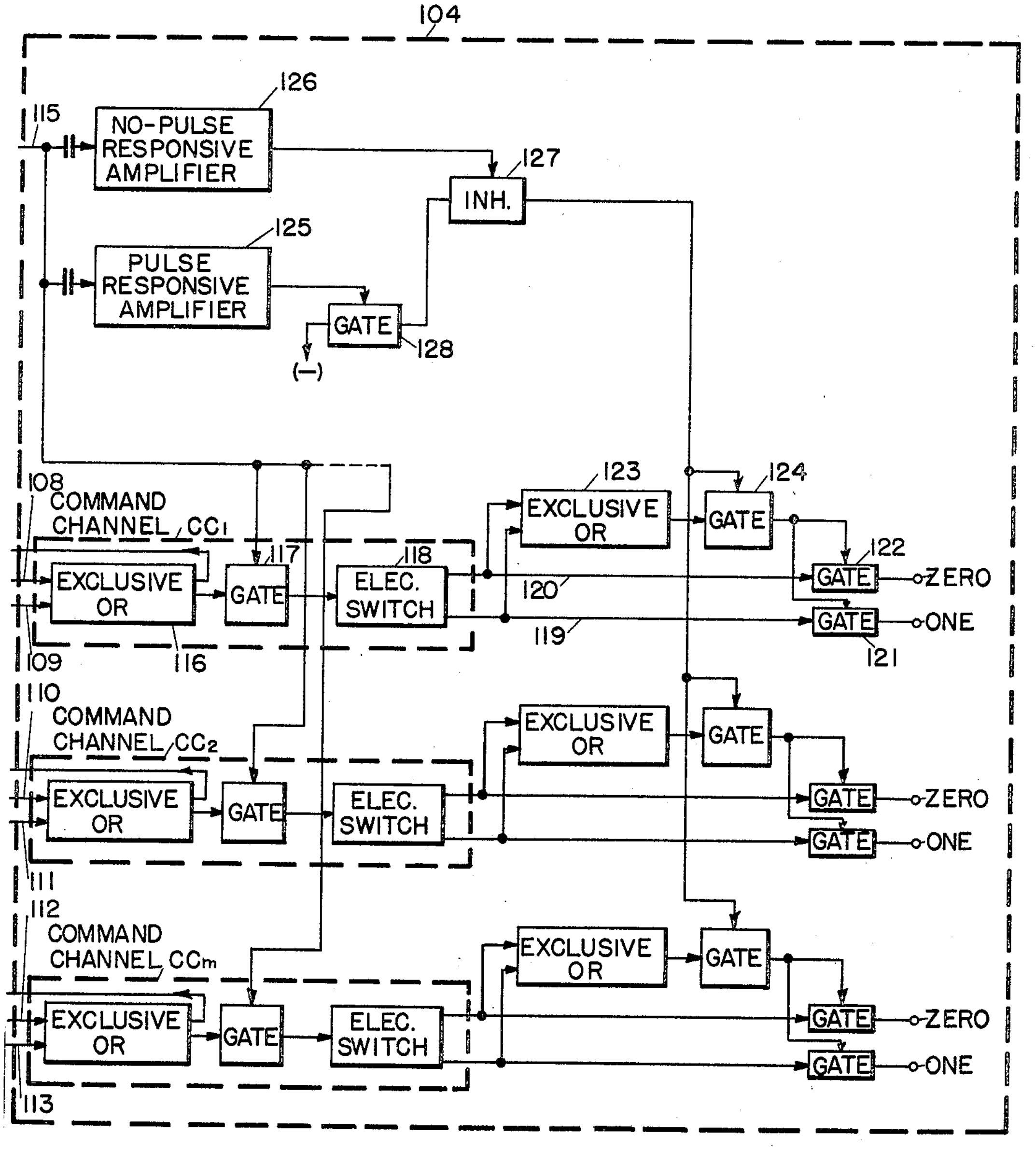

FIGS. 4A and 4B when placed side by side represent a detailed block diagram of a fail-safe receiving station for receiving information from the transmitter of FIG. 2.

Figure 5:
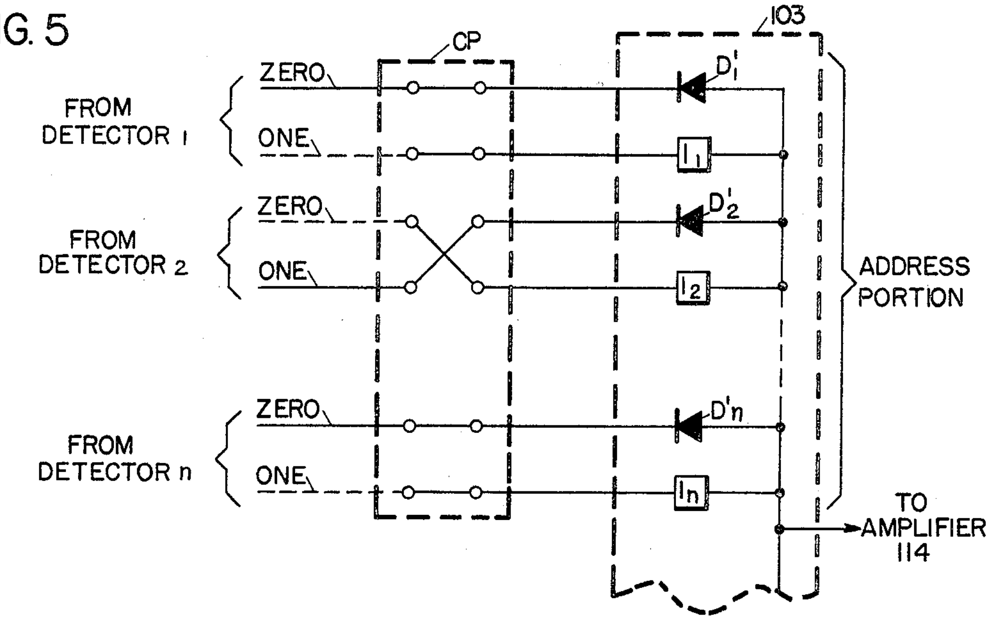

FIG. 5 is a schematic diagram of the address portion of the AND gate and the coded plug of FIG. 4A.

FIG. 6A is a simplified block diagram showing how the output of the receiving stations of FIGS. 4A and 4B can be connected for automatic railroad locomotive operation.

FIG. 6B is a code chart illustrating locomotive functions which may be performed in accordance with a binary code received by the decoder of FIG. 6A.

FIG. 7 is a network block diagram showing how two locomotives can be remotely controlled separately over a common carrier frequency.

Figure 8:
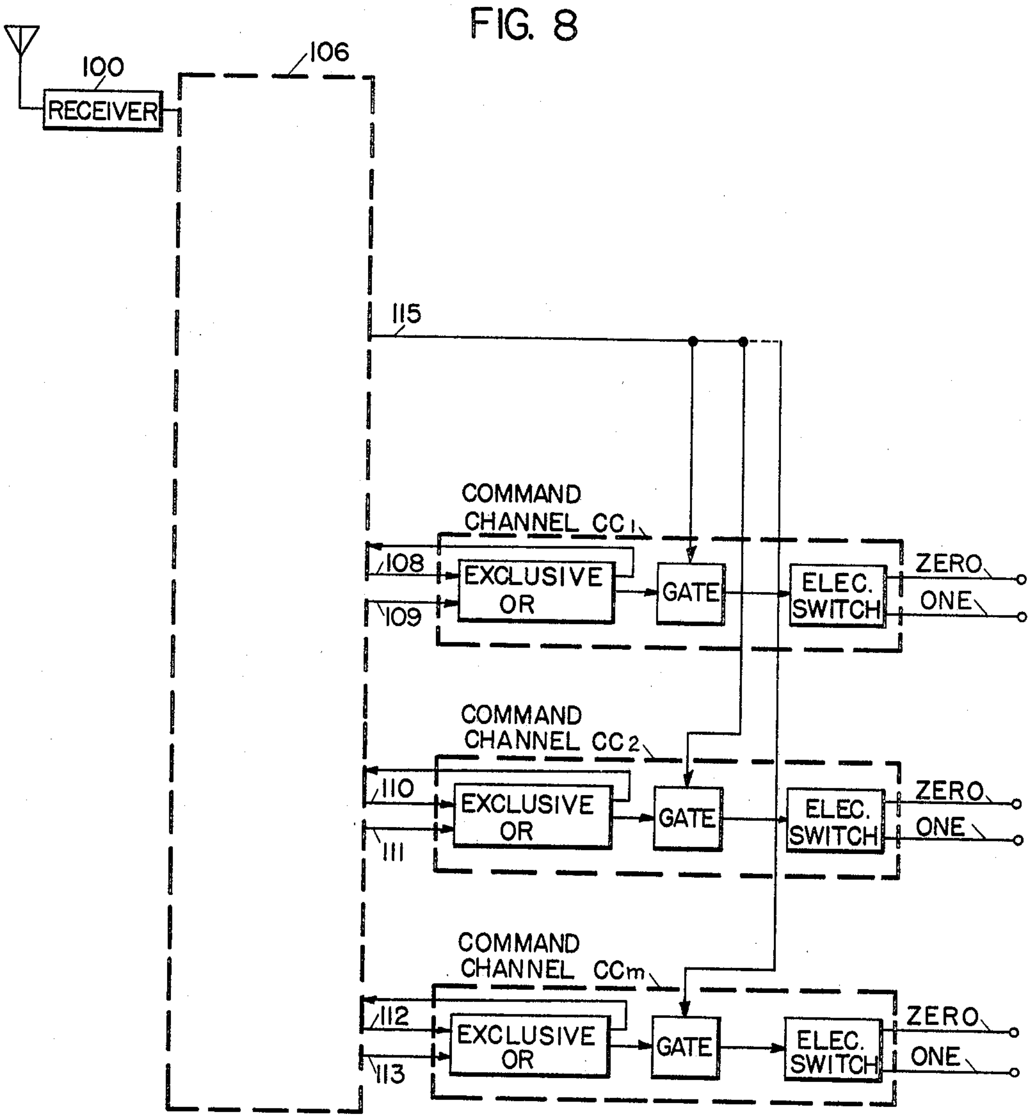

FIG. 8 is a functional block diagram of a basic receiving station for reception of signals from the transmitter of FIG. 2 for use with an inherently fail-safe remotely controlled system which automatically halts operations upon cessation of received pulses.

Figure 1A:
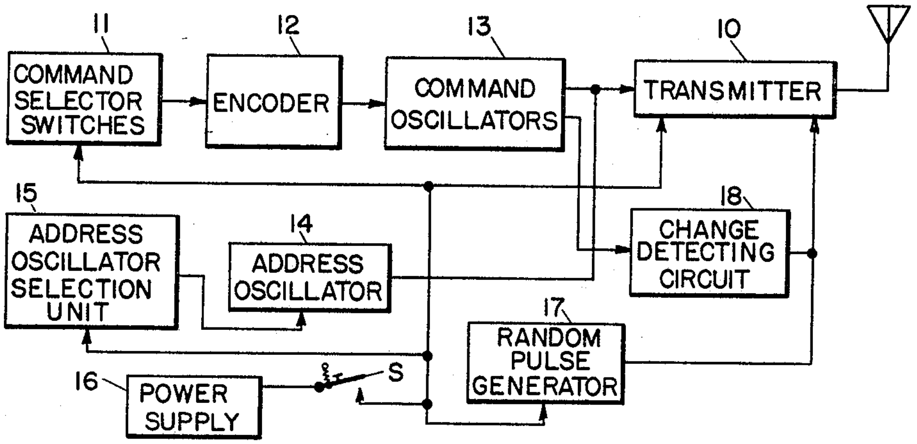
FIG. 1A is a simplified functional block diagram of the transmitting station in accordance with the invention.

Referring first to the simplified functional block diagram of the transmitting station of FIG. 1A, there is shown a transmitter 10 receiving modulating signals from a group of command oscillators 13 and a group of address oscillators 14. Selection of a predetermined command modulation signal for the transmitter is achieved by selective triggering of predetermined command oscillators from an encoder 12, which in turn is controlled from a plurality of command selector switches 11. Similarly, selection of a predetermined address modulation signal for carrying proper address information in the transmitter output signal is achieved by constant energization of predetermined oscillators in the group of address oscillators 14 through an address oscillator selection unit 15. This selection unit may include a coded plug for supplying power from a power supply 16 to the preselected address oscillators.

A random pulse generator 17 is coupled to transmitter 10 for keying the transmitter each time a pulse is produced by the generator. The pulses produced by the generator are random pulses; that is, the pulses recur at a randomly varying repetition rate. The pulse repetition rate, however, is variable only within specified rate limits.

A change detecting circuit 18 also receives output from command oscillators 13 and is designed to provide a single keying pulse for transmitter 10 whenever a new sequence of command oscillators is triggered by encoder 12. Thus, although thetransmitter is keyed by pulses having a varying pulse repetition rate, it is also keyed by an additional pulse produced immediately when a new sequence of command oscillators begins oscillating.

A switch S is interposed between power supply 16 and energization circuits coupled to command oscillator switches 11, random pulse generator 17, transmitter 10 and address oscillator selection unit 15. This switch can be used to function as a "dead-man switch"; that is, the switch may be spring loaded to open, so that if the operator for any reason releases his grip on the switch, no signals are produced from the transmitting station. This condition can be interpreted by the receiving equipment to produce a stop command to the controlled apparatus. Moreover, when the operator leaves his equipment, conservation of power supply energy is achieved.

Where the transmitting station is operated as a man-carried unit, if the unit be designed to be worn by the operator and thereby moved only in a substantially horizontal plane, switch S may be a mercury switch which opens when the equipment is tilted at an angle greater than a specified amount from the horizontal plane. Such switch also provides "deadman" protection.

Power supply 16 comprises a battery pack when the transmitting station is utilized in a man-carried operation. However, the transmitting station can easily be adapted to operate from any fixed or mobile power supply, whether it be alternating or direct current.

For transmitting station operation, preselected oscillators of the address and command oscillator groups are turned on, assuming switch S is closed. The address oscillators are selected by means of address oscillator selection unit 15, which applies steady energization to the preselected address oscillators. The command oscillators are selected by operation of the desired switch in the group of command selector switches 11. Operation of a command selector switch applies a voltage to encoder 12, the output of which produces operation of command oscillators 13 in accordance with the desired command.

Outputs from both command and address oscillator groups 13 and 14 are applied to the input of transmitter 10, thereby modulating the transmitter carrier frequency with the oscillator frequencies. Each time a pulse is produced from pulse generator 17, transmitter 10 is keyed, producing an output pulse containing the transmitter carrier frequency and the modulation provided by both the command and address oscillators. Moreover, each time a new command is selected, change detecting circuit 18 senses the change and keys the transmitter immediately. This permits immediate response to the new command by the receiving equipment.

When the actuated command selector switch is released, a new command code is applied to command oscillators 13, producing a new modulating signal for the transmitter. This change is also detected by change detecting circuit 18, and again the transmitter is keyed immediately upon the change.

Figure 1B:
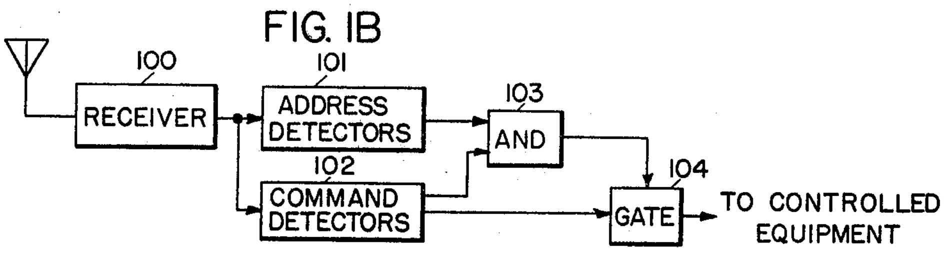
FIG. 1B is a simplified functional block diagram of the receiving station in accordance with the invention.
Figure 1C:
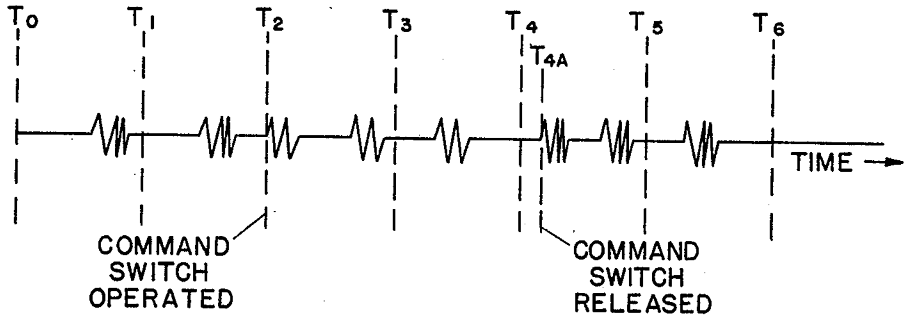
FIG. 1C is a graph of waveforms produced by the transmitting station of FIG. 1A.

FIG. 1C illustrates output pulses produced by the transmitter of FIG. 1A during a specified time interval $T_0$–$T_6$. This interval is divided into average periods of operation of random pulse generator 17 of FIG. 1A. Thus, $T_0$–$T_1$ represents a first average interval, $T_1$–$T_2$ represents a second average interval, etc.

Within interval $T_0$–$T_1$, a frequency modulated output pulse is shown. Within interval $T_1$–$T_2$ a second frequency modulated output pulse containing the same modulation as the first pulse is shown. At time $T_2$, assume a command selector switch is operated. This provides new command modulating frequencies on an output pulse produced by transmitter 10 immediately upon operation of the switch. Moreover, while the switch is held in the operated position, each pulse randomly produced by the transmitter contains the new modulation. Since the random pulse generator continues producing random pulses at its average rate, a second transmitter output pulse is produced in the interval $T_2$–$T_3$, containing the new modulation information.

At time $T_{4A}$, the operate command selector switch is released. This produces ne wcommand frequencies from command oscillators 13 identical to those command frequencies produced prior to operation of the command selector switch, and again change detecting circuit 18 keys the transmitter, immediately producing an output pulse containing the original modulation. A second pulse is also produced within the same interval, since the random pulse generator continues its normal operation. During interval $T_5$–$T_6$, another output pulse containing the original modulation is produced by the transmitter, and so on. Moreover, it should be noted that some average intervals may contain no pulses, while others may contain two pulses.

FIG. 1B is a simplified functional block diagram of a receiving station for receiving pulses such as those illustrated in FIG. 1C which are produced by the transmitting station of FIG. 1A. The receiving station comprises a receiver 100, the output of which is applied in parallel to a group of address detectors 101 and a group of command detectors 102. These detectors are responsive Outputs from address detectors 101 and command detectors 102 are applied to an AND circuit 103. More-
to the modulating frequencies received by receiver 100.
over, outputs of the command detectors are also applied individually to separate gate circuits, collectively designated 104.

Proper receiving station operation occurs when a modulated pulse is received by receiver 100. Assuming presence of the proper modulating frequencies, AND circuit 103 produces an output signal which is applied to gate 104. When gate 104 is thereby opened, the command code as provided by command detectors 102 is passed through the gate to the controlled equipment, for operation thereof.

Referring next to FIG. 2 for a more detailed description of the transmitting station, transmitter 10, which can be any type of frequency modulated transmitter, is shown, for exemplary purposes, to comprise an oscillator 20 which receives modulation from a modulator 19. Oscillator output is supplied to a buffer amplifier 21, the output of which is coupled through a pair of frequency tripler circuits 22 and 23 connected in cascade, to an intermediate power amplifier 24, and thence to a power amplifier 25. Output from the power amplifier is applied to a transmitting antenna 28 through a pair of frequency doubler circuits 26 and 27 connected in cascade.

A binary code is used to trigger a fixed number of predetermined oscillators in command oscillator group 13 in accordance with the binary output of encoder 12. This binary, code is produced by binary encoder 12 in accordance with the operated command selector switch in the group of command selector switches 11. Each oscillator in the command oscillator group produces a predetermined frequency $f_1$–$f_{2n}$, where $n$ equals the number of pairs of oscillators in the command oscillator group and consequently the number of bits in the command word.

Each output conductor from encoder 12 is designated as a binary ZERO or ONE. The ZERO conductors are connected so as to trigger certain oscillators in the command oscillator group, while the ONE conductors are connected to trigger the remaining oscillators in the command oscillator group. Each conductor is coupled to but one oscillator, and triggers that oscillator upon energization.

Address oscillator group 14 comprises oscillators oscillating at frequencies $f_{2n+1}$–$f_{2n+2m}$, where $m$ equals the number of pairs of oscillators in the address oscillator group and consequently the number of bits in the address word. The address oscillator selection unit 15 is coupled to selected oscillators in the address oscillator group and supplies power to these oscillators for maintaining them in constant oscillation.

Outputs of every oscillator in command oscillator group 13 and address oscillator group 14 are coupled together so as to provide a composite output signal for application to the transmitter. Although these oscillators are shown connected in parallel, they can be connected in series instead, according to the dictates of choice.

The composite output of the aforementioned oscillators is coupled to an amplifier 29, the output of which is coupled to the input of modulator 19. Thus, transmitter 10 receives its modulation from both the command oscillator group and the address oscillator group.

A second output is taken from each oscillator in the command oscillator group and applied through a series-connected capacitor $C_1$–$C_{2n}$ and diode $D_1$–$D_{2n}$, located in change detector circuit 18, through an amplifier 30 to the input of an amplifier 31. Each junction between the capacitor and diode is coupled to ground through a resistor $R_1$–$R_{2n}$, respectively. Each RC combination is selected to permit only transient changes of predetermined values, to pass therethrough. These changes occur when the command oscillator, to which the individual capacitor is coupled, begins or halts oscillation. Moreover, each diode $D_1$–$D_{2n}$ is connected with proper polarity so as to pass therethrough only those transient changes which occur when the oscillator, to which it is coupled through a corresponding capacitor, begins oscillation.

Random pulse generator 17 is also coupled to the input of amplifier 31, and provides pulses which recur periodically within certain preselected time limits, but at random times within these limits. In other words, the generator produces a steady train of pulses having a pulse repetition rate varying at random within predetermined limits. Although many techniques for producing random pulses are available, one technique which works very well with this system is to utilize a noise generator producing random noise. The wide band noise spectrum can then be filtered through a bandpass circuit having a center frequency and bandwidth of values designed to produce the desired variable pulse repetition rate. Alternatively, each noise generator pulse may be applied to an integrating circuit. When the integrated pulse amplitude reaches a predetermined value, the pulse is applied to amplifier 31, and a new noise pulse begins to be integrated.

Another technique for generating random pulses involves utilization of a pair of free-running multivibrators of almost the same frequency. The multivibrator outputs are coupled together so as to apply a combined signal to the input of amplifier 31. The combined signal can thus be seen to have a varying pulse repetition rate.

Output of amplifier 31 is applied to triplers 22 and 23, intermediate power amplifier 24 and power amplifier 25. Each time a pulse is produced from amplifier 31, the triplers, intermediate power amplifier and power amplifier are rendered conductive for the entire interval of the pulse. When the pulse ends, the triplers, intermediate power amplifier and power amplifier are rendered nonconductive, since loss of voltage on the output of amplifier 31, the triplers, intermediate power amplifier and power amplifier are again rendered conductive, and so on.

In operation, assume certain preselected oscillators in the address oscillator group are continuously energized by address oscillator selection unit 15 so as to maintain continuous oscillation. The combined frequencies produced by those oscillators in the address oscillator group which are energized are applied to the modulator of transmitter 10.

Each time a command selector switch is operated, a code is produced from encoder 12, in such fashion as to energize preselected oscillators in command oscillator group 13, in accordance with the selected code. During intervals in which no command switch is operated, a predetermined group of oscillators in the command oscillator group is energized. The frequencies produced by the oscillators of command oscillator group 13 are combined with those produced by address oscillator group 14, and the composite signal is applied to modulator 19 of transmitter 10 through amplifier 29.

Upon operation of a command selector switch, those oscillators of comand oscillator group 13 which are thereby energized provide a pulse through the series circuit comprising the capacitor and diode coupled thereto. The capacitor then acquires a unidirectional charge, and as long as the oscillator coupled thereto remains in oscillation, the charge remains stored on the capacitor, preventing additional pulses from being produced by the capacitor. The pulse provided by the capacitor when the oscillator coupled thereto is turned on, is coupled through amplifiers 30 and 31 to triplers 22 and 23, intermediate power amplifier 24 and power amplifier 25 of the transmitter, thereby turning on the aforementioned transmitter components. The modulated carrier produced from oscillator 20 is thus coupled through the transmitter to antenna 28, from whence it is radiated through space. Thus, upon initiation of a command, the signal corresponding thereto is immediately radiated, whether or not random pulse generator 17 has produced an output pulse at the instant the command selection is made.

After the command selection has been made and the actuated command selector switch is released, the charge stored on each capacitor coupled to an address oscillator which is deenergized, due to release of the actuated command selector switch, leaks off to ground. Thus, each time random pulse generator 17 turns off triplers 22 and 23, intermediate power amplifier 24 and power amplifier 25, a steady state command signal and the preselected address signal are transmitted over the air. Moreover, the controlled apparatus may then be operatively maintained in the new position to which it was switched by the selected command signal, until a new command signal is applied to the system.

It will be noted by those skilled in the art that frequency modulated transmitter 10 is of a standard type; that is, the carrier signal generated by oscillator 20 is modulated by modulator 19 and then coupled through the buffer amplifier and the pair of frequency tripling stages, amplifier through the intermediate power amplifier and power amplifier, and then coupled through the pair of frequency doubling stages to the antenna, from whence the signal is radiated. In the particular transmitter configuration shown in FIG. 1, the oscillator frequency is multiplied 36 times by the triplers and doublers. However, the number of frequency multipliers in the transmitter are dependent upon the operating frequency or frequency deviation.

It should be noted that the "capture effect" previously described can occur only when a pulse from separate transmitters occurs simultaneously. As long as pulses from any two transmitters operating on the same carrier frequency do not occur simultaneously, the "capture effect" does not occur, since each transmitter is on the air only during the interval of its radiated pulse. However, if we assume that both a desired transmitter and an undesired transmitter radiate their pulses simultaneously, and that the undesired transmitter is in closer proximity to the receiver than the desired transmitter, the undesired transmitter signal is received by the receiver and the desired transmitter signal cannot be received. Under these circumstances, no command signal can pass through the apparatus coupling the receiver to the control system. However, because the pulses from each transmitter occur at random, the probabiilty that the next subsequent pulse radiated from each transmitter will occur simultaneously is infinitesimal; therefore, if the first signal radiated from the desired transmitter at the instant a command switch is operated does not get through to operate the apparatus because the undesired transmitter in closer proximity to the receiver has also radiated a command pulse at exactly the same instant, the next following pulse from the desired transmitter will get through to operate the apparatus. To insure that the second pulse radiated from the desired transmitter operates the controlled apparatus, it is merely necessary that the actuated command selector switch be maintained in its actuated position for the maximum possible period between pulses produced by the random pulse generator; for example, 1.5 seconds. Moreover, if during the time that the undesired transmitter is in closer proximity to the receiver than the desired transmitter, the infinitesimal probability of simultaneous occurrence of two successive pulses radiated from both the desired and undesired transmitter should still be considered to be too great, it is possible to require that the command selector switch be maintained in the actuated position for an additional maximum period between pulses produced by the random pulse generator; for example, a total of three seconds. This would require that for improper operation, three successive random pulses produced by two separate transmitters at a time when the undesired transmitter is in closer proximity to the receiver than the desired transmitter, occur simultaneously. For all practical purposes, the probability that such condition will occur is zero. However, if such condition should occur, the controlled apparatus is designed so as to automatically cease operation if no pulses are received for the specified duration. This assures fail-safe operation.

Figure 3:
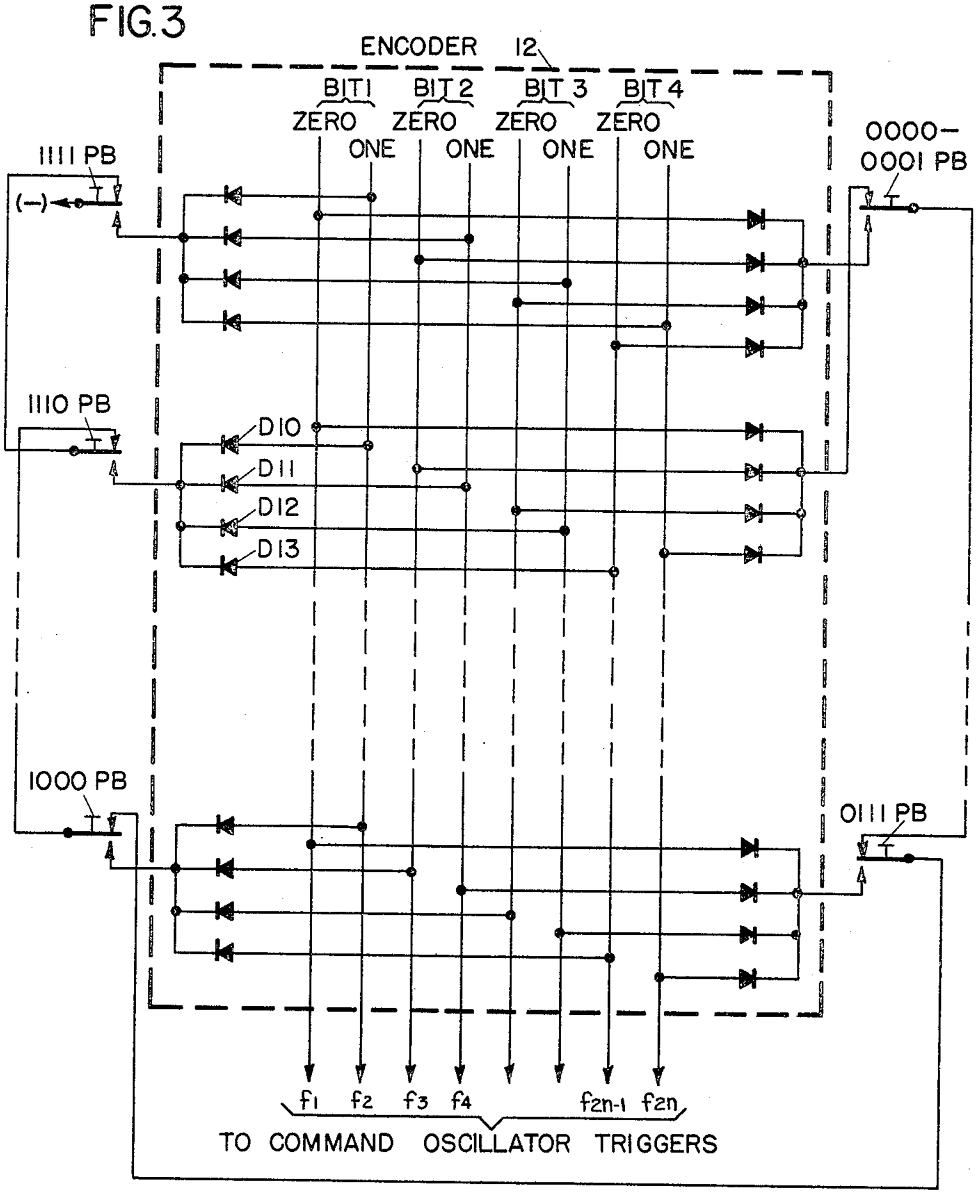
FIG. 3 is a schematic diagram of a possible encoder which may be utilized in the transmitting station of FIG. 2.

Turning now to FIG. 3 there is shown a schematic diagram of one version of encoder 12 which may be used with the transmitting station of FIG. 2. The encoder comprises a diode matrix wherein groups of four diodes are each coupled to individual push buttons comprising the command selector switches. Depression of any single push button produces a predetermined output code which is coupled to selected oscillators in the command oscillator group of FIG. 1, triggering these oscillators. For example, if a push button 1110PB is depressed, the cathode of diodes $D_{10}$, $D_{11}$, $D_{12}$, and $D_{13}$ are coupled to the negative side of the direct current power supply so as to provide supply voltages for the selected command oscillators.

Alternate conductors coupled to the command oscillators are designated ZERO and ONE. Thus, depression of push button 110PB couples the three ONE conductors on the left to the negative side of the direct current supply through diodes $D_{10}$, $D_{11}$ and $D_{12}$, respectively, while diode $D_{13}$ couples the ZERO conductor on the right to the negative side of the direct current supply. Thus, in accordance with the code selected by energizing predetermined vertical conductors by depression of push button 1110PB, certain command oscillators are triggered. For example, diode $D_{10}$ by applying energization to the vertical conductor to which it is coupled, produces a frequency $f_2$ by triggering the oscillator in the command oscillator group which produces this frequency. This frequency is generated for the duration of time in which push button 1110PB is depressed. Likewise, the oscillator producing a frequency $f_1$ in the command oscillator group of FIG. 1 remains deenergized, since it is not triggered. Thus, the digit produced by the pair of oscillator generating frequencies $f_1$ and $f_2$ in the command oscillator group of FIG. 2 is a binary ONE. In like fashion, additional binary digits are generated by the remaining pairs of oscillators in the command oscillator group of FIG. 1, in accordance with the code generated by encoder 22. Moreover, it should be noted that regardless of whether a digit is a ONE or ZERO, the digit is represented by a signal. The signal frequency however, is dependent upon whether the digit is a ONE or ZERO.

The encoder of FIG. 3 is usable with a code containing up to four binary digits or bits. The push buttons for operating encoder 12 are connected in series through their front contacts. Depression of any push button removes energiaztion from preceding push buttons coupled to the front contact of the depressed push button. Thus, depressing any given push button prevents operation of the encoder from all preceding push buttons. On the other hand, subsequent push buttons continue to receive energy, so that if a subsequent push button is depressed, it takes over control of the encoder and deenergizes the previously depressed push button. For this reason, push button 1111PB should have the most important function, such as a stop control, associated therewith, push button 1110PB should have the next most important function associated therewith, and so on, down to push button 0000–0001PB, one contact of which always produces a code from the encoder regardless of whether the front or back contacts of the push button is closed, provided all other push buttons are not operated. Whenever any push button is depressed, push button 0000–0001PB receives no energization; however, upon release of the depressed push button the command code originally produced by button 0000–0001PB is again produced. Moreover, this code is continuously produced until a new push button is depressed.

The arrangement of push buttons in FIG. 3 provides the additional advantage of avoiding jumbled codes which otherwise would occur if more than one push-button were inadvertently depressed. Although the switches for operating encoder 22 are illustrated as being push buttons, any type of switches may be used. A two-position selector switch is especially appropriate for producing codes 0000 and 0001.

Turning next to FIGS. 4A and 4B, a fail-safe system for reception and classification of the signal produced by the transmitting system of FIG. 2, preparatory to application to the controlled equipment for control thereof, is shown. Receiver 100 receives the signal radiated from the transmitting system of FIG. 2 at its antenna 105 and demodulates the signal. The modulating frequencies thereby received are then coupled to a switching circuit 106 which comprises a plurality of detectors coupled in parallel to the output of receiver 100. A first group of these detectors, detectors 1–$n$, provide outputs to AND gate 103. These detectors couple the address code in the received signal to AND gate 103, and are designated address detectors. A second group of detectors coupled to receiver 100, detectors $n+1$–$n+m$, provide AND gate 103 with an indication of the presence of a command code in the received signal, and are designated command detectors. Each command code indication is coupled to the AND gate through an individual command channel, described infra.

Each address detector comprises a pair of band pass filters, the output of each filter being coupled to a separate amplifier. Thus, for example, detector 1 produces an output when either frequency $f_1$ or $f_2$ is present in the output signal of receiver 100. Output from filter $f_1$ represents a binary ZERO, while output from filter $f_2$ represents a binary ONE. The output of every address detector filter is individually amplified and applied to AND gate 103 through a coded plug CP. In this manner, the address code is applied to the AND gate.

In similar fashion, each command detector also comprises a pair of band pass filters. The output of each command detector filter is individually amplified and checked for presence of one and only one command bit. If this condition is met, the command bit is coupled to AND gate 103 for indicating presence of that command bit in the output signal of receiver 100. Binary ZERO outputs from command detectors $n+1$, $n+2$, and $n+m$ are applied to conductors 108, 110, and 112, respectively, while binary ONE outputs from detectors $n+1$, $n+2$, and $n+m$, are applied to output conductors 109, 111 and 113 respectively. Thus the circuit is capable of handling an address word comprising $n$ discrete bits of information, and a command word comprising $m$ discrete bits of information, which is the same number of bits transmitted in the address and command words produced by the transmitting system of FIG. 2. Output of AND gate 103 is coupled through an amplifier 114 to an output conductor 115 of switching circuit 106.

FIG. 4B is a detailed block diagram of collective gate circuit 104 of FIG. 1B. As shown in FIG. 4B, a group of command channels $CC_1$–$CC_m$ are provided for receiving output signals from detectors $n+1$–$n+m$, respectively. Each command channel comprises an EXCLUSIVE OR circuit coupling one output signal through a gate circuit to an electronic switch and coupling a second output signal to the input of AND gate 103. For example, command channel $CC_1$ comprises EXCLUSIVE OR circuit 116, gate circuit 117 and electronic switch 118. Either a ONE or ZERO produced by detector $n+1$ is coupled through EXCLUSIVE OR circuit 116 to gate circuit 117 and AND gate 103. EXCLUSIVE OR circuit 116 insures that either a ONE or a ZERO is applied to command channel $CC_1$. If both a ONE and a ZERO are applied to EXCLUSIVE OR circuit 116, or if neither a ONE nor a ZERO is applied to EXCLUSIVE OR circuit 116, no signal is coupled to the inputs of gate circuit 117 and AND gate 103. This means that AND gate 103 cannot receive all the necessary inputs required for it to produce an output signal. The controlled apparatus therefore receives no command signal, causing a stop command to be applied to the apparatus after elapse of a predetermined interval, as previously explained. However, even if the AND gate should produce an output signal, still the controlled equipment receives neither a ONE nor a ZERO from command channel $CC_1$, due to absence of input to gate 117. Presence of neither a ONE nor a ZERO at the output of any one of command channels $CC_1$–$CC_m$ is detected by the receiving station and used for applying a stop command to the controlled equipment.

Each gate circuit in the command channels is coupled to the output of amplifier 114 through conductor 115, and receives gating signals therefrom. Each gate circuit also couples an input received from the preceding EXCLUSIVE OR circuit to the succeeding electronic switch only when a signal is received from amplifier 114, indicating that every detector in switching circuit 106 is coupling a proper output sginal to AND gate 103. This requires that each detector for the address code be connected to AND gate 103 in such manner that the desired binary bit, a ONE or a ZERO, is coupled directly to AND gate 103 from each detector, and the undesired binary bit is inverted and coupled to the AND gate, depending upon whether each particular detector is intended to carry a binary ONE or ZERO for the address. Then, if it be desired to change the address of the particular receiving station, it is merely necessary to connect only the proper output conductors from address code detectors 1—$n$ to AND gate 103 in accordance with the address code desired to be received. For example, in FIG. 4A, detector 1 is connected to apply only a binary ONE and not apply a binary ZERO to AND gate 103, detector 2 is connected to apply only a binary ZERO and not apply a binary ONE to AND gate 103, and detector $n$ is connected to apply a binary ONE and not apply a binary ZERO to AND gate 103. The conductors shown solid from detectors 1—$n$ indicate that they couple the address code directly to AND gate 103, while the dotted conductors indicate that they are coupled to an inverter in the AND gate 103. If it be desired to change the address code to which AND gate 103 is responsive, then the connections between detectors 1—$n$ and AND gate 103 would be different. These connections are made through a coded plug CP, and are described in more detail, infra.

Each electronic switch used in the command channels provides one of a pair of output voltages, depending upon whether a ONE or a ZERO is produced at the detector coupled to the command channel containing the electronic switch. For example, electronic switch 118 produces either a ONE on a first output conductor 119 or a ZERO on a second output conductor 120, depending upon whether a ONE or ZERO is produced at the output of detector $n+1$. Output voltage amplitude of EXCLUSIVE OR circuit 116 controls the condition of electronic switch 118; that is, a ONE produced by detector $n+1$ causes EXCLUSIVE OR circuit 116 to produce a voltage having a first amplitude, while a zero produced from detector $n+1$ causes EXCLUSIVE OR circuit 116 to produce a voltage having a second amplitude. This output voltage amplitude is coupled through gate circuit 117 to electronic switch 118 which is sensitive to its input voltage amplitude such that if the first voltage amplitude is present, switch 118 energizes its output conductor 119, while if the second voltage amplitude is present, switch 118 energizes its output conductor 120. Command channels $CC_2$–$CC_m$ operate in a manner similar to that described for command channel $CC_1$.

Each output conductor from each command channel is coupled to an input of a separate gate circuit. Thus, output conductor 119 of command channel $CC_1$ is coupled to the input of final gate circuit 121, while output conductor 120 of command channel $CC_1$ is coupled to the input of final gate circuit 122. Each output conductor of each command channel is also coupled to one input of an EXCLUSIVE OR circuit. Thus, output conductor 119 of command channel $CC_1$ provides a first input signal to EXCLUSIVE OR circuit 123, while output conductor 120 of command channel $CC_1$ provides a second input to EXCLUSIVE OR circuit 123.

Output from each EXCLUSIVE OR circuit receiving output from one command channel provides a first input signal to a gate circuit, the output of which, in turn, is coupled to a second or gating input of each gate circuit receiving output directly from the command channel. For example, output of EXCLUSIVE OR circuit 123 is coupled to a first input of gate circuit 124, the output of which provides gating inputs to gate circuits 121 and 122. Thus, if only one output is produced from command chanel $CC_1$, and if gate circuit 124 is open, EXCLUSIVE OR circuit 123 produces a gating input for gate circuits 121 and 122. Depending upon whether output conductor 119 or 120 of command channel $CC_1$ is energized, a second input will be applied to either gate circuit 121 or 122, respectively. The gate circuit having two input signals applied thereto then produces an output. For example, if gate circuit 121 receives two input signals, a binary ONE appears at the output of gate circuit 121, while if gate circuit 122 receives two input signals, a binary ZERO is produced on the output of gate circuit 122. In like fashion, a binary ONE or ZERO is produced by the apparatus coupled to the output of the remaining command channels $CC_2$–$CC_m$.

Control of the gate circuits which provide gating input signals to the final gate circuits of the receiving station is maintained by existence of output pulses from amplifier 114. A pulse responsive amplifier 125 and a no-pulse responsive amplifier 126 are capacitively coupled to the output of amplifier 114 through a conductor 115. Output of no-pulse responsive amplifier 126 provides a control signal to an INHIBIT gate 127, while output from pulse responsive amplifier 125 provides a gating signal for a gate circuit 128. Gate circuit 128 and INHIBIT gate 127 provides a series circuit from the negative side of the receiving station direct current power supply to second, or gating inputs of the gate circuits providing gating signals to the final gate circuits.

As long as pulses are produced from amplifier 114, indicating that receiver 100 is receiving pulses, gate circuit 128 receives a gating signal from amplifier 125, permitting current to flow through gate circuit 128. The signal applied to gate circuit 128 from amplifier 125 may be in the form of a pulse train if, for example, the output of amplifier 125 is applied directly to the coil of a relay having a front contact which thereby maintains a complete circuit between the negative side of the receiving station direct current power supply and the second input of INHIBIT gate 127. On the other hand, amplifier 125 may integrate the received pulses, and use the integrated output signal for controlling gate circuit 128.

Similarly, no-pulse responsive amplifier 126 produces an output signal only when no pulse train is applied to its input. This occurs both when no output is provided from amplifier 114, as well as when a steady direct current is provided from amplifier 114. Therefore, as long as pulses are received by amplifier 126, no control signal is applied to INHIBIT gate 127 from amplifier 126, and the INHIBIT gate thus maintains a complete circuit therethrough.

Output of INHIBIT gate 127 provides a gating signal for the gate circuits furnishing gating signals to the final gate circuits. Thus, if amplifiers 125 and 126 both receive pulses, a gating signal is applied to the gate circuits controlling the final gate circuits. A gating signal can then be coupled to the final gate circuits from each command channel coupled thereto.

For example, when amplifier 114 provides output pulses, gate circuit 124 receives gating signals from INHIBIT gate 127 and input signals from EXCLUSIVE OR circuit 123, thereby furnishing a gating signal for each of gate circuits 121 and 122. Then depending upon whether conductor 119 or 120 is energized, a binary ONE or ZERO is produced at the output of the receiving station. Thus, it is obvious that checks are provided in the system to assure that before a command signal reaches the controlled apparatus, pulses are continuously received from receiver 100, indicating that the operator is remaining at his transmitting station. Moreover, each command signal, or bit, cannot reach the controlled apparatus unless one and only one output signal is produced from the command detector providing the bit. Furthermore, those skilled in the art will readily recognize that additionally fail-safety is built into the receiving system by assuring that outputs must be received from every command channel in order to enable a command signal to actuate the controlled apparatus.

In operation, each time a pulse containing address and command modulating frequencies is received at receiver 100, if the proper address is received by the receiver and the proper number of command modulating frequencies is received by the receiver, AND gate 103 provides an output signal to amplifiers 125 and 126, as well as to the gate circuits in the command channels. Under these conditions, each signal produced by a command detector is applied to the EXCLUSIVE OR circuit in the respective command channel. Each command signal or bit is then passed through the gate circuit in the respective command channel to the electronic switch associated therewith. Depending upon the value of input voltage amplitude applied to the electronic switch, either a ONE or ZERO is produced at the output of the command channel.

Consider now operation of the circuit coupled to the output of command channel $CC_1$, which is identical to operation of the circuits coupled to the output of command channels $CC_2$–$CC_m$. If a binary ONE is produced at the output of electronic switch 118, gate circuit 121 receives an input from conductor 119. Similarly, EXCLUSIVE OR circuit 123 receives an input from one of the two outputs of electronic switch 118. This provides a first input to gate circuit 124. A second or gating input is applied to gate circuit 124 from INHIBIT circuit 127 in series with gate circuit 128. INHIBIT circuit 127 and gate circuit 128 provide a conducting path permitting application of a gating signal to gate circuit 124 when amplifier 125 produces an output and amplifier 126 produces no output. Under these circumstances, the output of EXCLUSIVE OR circuit 123 is coupled through gate circuit 124 and provides gating signals for gate circuits 121 and 122. Thus, depending upon which of gate circuits 121 and 122 are energized from electronic switch 118, either a ONE is produced at the output of gate circuit 121, or a ZERO is provided at the output of gate circuit 122.

If amplifier 125 should cease producing an output signal, or if amplifier 126 should commence producing an output signal, either of which condition indicates that pulses are no longer being coupled through amplifier 114 from receiver 100, gating voltage is removed from gate circuit 124, thereby preventing gating voltage from being applied to gate circuits 121 and 122. This condition then prevents output from command channel $CC_1$ from reaching the controlled apparatus. In similar fashion, outputs from command channels $CC_2$–$CC_m$ are also prevented from being applied to the controlled apparatus. A stop command is thereby applied to the controlled apparatus in a manner described, infra.

FIG. 5 is a schematic diagram of the connections in coded plug CP and the address portion of AND gate 103 of FIG. 4A. The coded plug permits any combination of interconnections from detectors $1-n$ to AND gate 103.

The address portion of the AND gate is made up of diodes $D_1'$–$D_n'$ and inverters $I_1$–$I_n$. The desired address frequencies from detectors $1-n$ are coupled through the coded plug to correspondingly numbered diodes, while the unused, or undesired, address frequencies are coupled to correspondingly numbered inverters. Thus, for proper operation of the address portion of the AND gate, signals must be applied to each of the diodes, in order to provide an output to amplifier 114 of FIG. 4A. Additionally, no signal must be provided to the correspondingly numbered inverters, to enable the inverters to provide outputs. Thus, if both these conditions are met, and additionally each command channel EXCLUSIVE OR circuit of FIG. 4B produces an output, AND gate 103 provides an output to amplifier 114.

In operation, as long as the proper address signals are applied to the AND gate, the diodes and inverters all provide output to amplifier 114, assuming presence of the proper number of command channel EXCLUSIVE OR gating signals at the AND gate. The gate thereby opens.

However, if no signal is applied to any one diode in the AND gate, no output is produced. Similarly, if a signal is applied to any one inverter in the AND gate, that inverter provides no output, and again no output is produced by the AND gate. Thus, the address portion of the AND gate checks for both presence of proper address signals, and absence of improper address signals. The command portion of the AND gate (not shown) is of conventional form.

FIG. 6A illustrates how controlled apparatus may be operated from the receiving station of FIGS. 4A and 4B. For illustrative purposes, assume that each receiving station operates a locomotive from a remote transmitter. Assume further that each receiving station provides a four bit command word. Thus, from the receiving station the four bit word may be applied to a decoder 200 which converts a binary coded input into energization voltage for predetermined conductors of a control cable 201. Such decoders are well-known in the art, and may consist of a circuit similar to the encoder circuit of FIG. 3 except that the groups of diodes apply output signals to actuate the control circuits of the controlled apparatus. Moreover, since ZEROES as well as ONES are represented by signals, fail-safety can readily be built into the sytem at the decoder by requiring that each command bit be represented by presence of either digit, and that absence of any bit cause deenergization of a circuit necessary to keep the apparatus in operation. However, a time delay is also built into the decoder so that absence of such bit must continue for a suitable specified duration, such as two and one half times the average interval between successive pulses received by the receiver, before operation of the controlled apparatus is halted.

In FIG. 6A, the control cable provides energization for locomotive controls 202. Since locomotive controls incorporate "deadman" switches for halting the locomotive when the switch is released, it is a simple matter for one skilled in the art to utilize an energized solenoid for holding the "deadman" switch and require that all command bits be present in order to maintain energization of the solenoid. Thus, loss of one or more command bits at the input to the decoder for longer than the specified duration causes a halt in locomotive operation.

FIG. 6B illustrates possible functions which may be performed on the locomotive carrying the receiving station, in accordance with a binary coded output provided by the receiving station. It should be noted that the functions listed in the table are not necessarily those which would be utilized in every case. Furthermore, the chart makes allowance for additional functions which may be added in place of the spare channels shown in the chart. Alternatively, it may be desired to utilize the spare channels to provide additional automatic brake stops. However, this is a matter of preference by the user of the system. Moreover, as explained previously, absence of one or more command bits for longer than a predetermined interval, and for any reason whatever, causes operation of the locomotive to cease.

FIG. 7 is an illustration of network operation wherein two locomotives are controlled individually from separate transmitting stations over the same carrier frequency $f_c$. Thus, a first transmitting station T1 communicates information to a first receiving station R1 which then couples an output code in accordance with the received signal to a first set of locomotive controls L1 for controlling a first locomotive in accordance with the coded information transmitted from station T1. Contemporaneously, a second transmitting station T2 operates over the same carrier frequency $f_c$, and communicates information to a second receiving station R2 which then couples an output code in accordance with the received signal to a second set of locomotive controls L2 for controlling the second locomotive in accordance with the coded information transmitted from station T2. Under circumstances such as these, assuming the power outputs of transmitting stations T1 and T2 are substantially identical, and propagation conditions for both transmitting stations are also substantially identical, if the distance between transmitting station T1 and receiving sation R2 is only slightly greater or slightly less than the distance between transmitting station T1 and receiving station R1, or the distance between transmitting station T2 and receiving station R1 is only slightly greater or slightly less than the distance between transmitting station T2 and receiving station R2, the possibility of interference can arise. In other words, a zone of interference exists in a particular area within range of both transmitting stations wherein pulses from both the desired and undesired transmitter are received by a receiver. No "capture effect" occurs under these circumstances. However, even under these circumstances, since transmitting station T1 produces random pulses and transmitting station T2 produces random pulses, it is highly improbable that two consecutive pulses produced from the two transmitting stations will occur simultaneously. Thus, the chance of interference is exeremely slight.

It should be noted that in the rare instance of simultaneous occurrence of two consecutive pulses from two separate transmitting stations under circumstances where the undesired transmitting station is in slightly closer proximity to the receiving station than the desired transmitting station so as to cause interference without the "capure effect," since each receiving station thereby receives more than allocated number of modulating frequencies, AND gate 103 of FIG. 4A does not open for two consecutive periods of pulse transmission. The locomotive controls are so designed as to produce a brake application on the locomotive when this condition occurs. A separate command selector switch must then be operated in order to restart the locomotive.

In some industrial operations, where the controlled apparatus can be designed to continue operating with a hiatus in the received pulse train of a duration of longer than the maximum interval between two consecutive received pulses, for example, for the maximum interval between three consecutive received pulses, the chance of interference under such circumstances is substantially nil, due to the extremely low probability that three consecutive pulses produced from two separate transmitting systems will occur simultaneously.

Turning now to FIG. 8 there is shown a second embodiment of the receiving station of FIGS. 4A and 4B wherein merely a basic receiving station can be used for receiving communications in the form of coded information under circumstances where an extremely high degree of fail-safety is not required. Thus, receiver 100 is shown coupled to switching circuit 106, the output of which is applied to command channels $CC_1$–$CC_m$ through respective pairs of conductors 108 and 109, 110 and 111, and 112 and 113. Existence of a signal on conductor 115 occurs upon presence of the proper number of address and command bits in the received signal as explained in connection with the operation of the circuit of FIG. 4A. Moreover, as previously explained, presence of a signal on conductor 115 opens the gate circuits in the command channels, permitting a binary ONE or ZERO to appear at the output of every command channel in accordance with the transmitted information.

Thus there has been described a system for accommodating a plurality of communicated messages on a single frequency without interference between simultaneously transmitted messages. The system utilizes pulses produced at random at each transmitting station for carrying radiated information from the aforementioned transmitting station. Each transmitter is thereby on the air for merely a fraction of each period, or time interval, between the start of two consecutive pulses, leaving the remaining time in each period for other transmissions to occur from other transmitters without interference from the first transmitter. Each receiving station can respond only to a signal having the proper address and proper number of command frequencies. If the total number of modulating frequencies is improper, or if the address does not contain the proper modulating frequencies, or if improper modulating frequencies are present in the address, the receiving station will not respond to the incoming signal. Moreover, the system can be designed so as to shut down the controlled apparatus if an improper signal is received for longer than a predetermined interval or if no signal is received for longer than a predetermined interval. The system readily lends itself to fail-safe communications and operations, and is compact and highly portable, with minimal power requirements.

Although but several embodiments of the present invention have been described, it is to be specifically understood that these forms are selected to facilitate in disclosure of the invention rather than to limit the number of forms which it may assume; various modifications and adaptations may be applied to the specific forms shown to meet requirements of practice, without in any manner departing from the spirit or scope of the invention.

What I claim is:

1. A method of communicating information from a transmitter to a receiver, comprising the steps of generating randomly recurring pulses, modulating each pulse with information in the form of two groups of modulating frequencies, transmitting the modulated pulses to a receiver, checking the pulses received by the receiver for presence of predetermined frequencies in one group of modulating frequencies, and providing an output code in accordance with the predetermined frequencies in the other group of modulating frequencies when the proper frequencies in the one group of modulating frequencies are present.

2. A method of communicating information from a transmitter to a receiver, comprising the steps of generating randomly recurring pulses, modulating each pulse with information in the form of two groups of modulating frequencies, transmitting the modulated pulses to a receiver, checking the pulses received by the receiver for presence of a predetermined number of modulating frequencies and presence of predetermined frequencies in one group of modulating frequencies, and providing an output code in accordance with the predetermined frequencies in the other group of modulating frequencies when the predetermined number of modulating frequencies is present and the proper frequencies in the one group of modulating frequencies are present.

3. A method of transmitting information from a first transmitting station to a first receiving station and from a second transmitting station to a second receiving station simultaneously on a single carrier frequency without interference, comprising the steps of generating randomly recurring pulses at the first transmitting station, generating randomly recurring pulses at the second transmitting station, frequency modulating each pulse with information at the first transmitting station, frequency modulating each pulse with information at the second transmitting station, radiating the modulated pulses from the first transmitting station to both of said receiving stations, radiating the modulated pulses from the second transmitting station to both of said receiving stations, checking the received pulses at each of said receiving stations for presence of a predetermined number of modulating frequencies, and providing an output code from each receiving station in accordance with a portion of the modulating frequencies when the predetermined number of modulating frequencies is present at the receiving station.

4. A method of transmitting information from a first transmitting station to a first receiving station and from a second transmitting station to a second receiving station simultaneously on a single carrier frequency without interference, comprising the steps of generating randomly recurring pulses at the first transmitting station, generating randomly recurring pulses at the second transmitting station, modulating each pulse at the first transmitting station with first and second groups of frequencies, modulating each pulse at the second transmitting station with third and fourth groups of frequencies, radiating the modulated pulses from the first transmitting station to both of said receiving stations, radiating the modulated pulses from the second transmitting station to both of said receiving stations, checking the received pulses at each of said receiving stations for presence of predetermined frequencies in said first and third groups of frequencies, and providing an output code from the first receiving station in accordance with the second group of frequencies when the first group of frequencies are present at the first receiving station, and providing an output code from the second receiving station in accordance with the fourth group of frequencies when the third group of frequencies are present at the second receiving station.

5. A method of transmitting information from a first transmitting station to a first receiving station and from a second transmitting station to a second receiving station simultaneously on a single carrier frequency without interference, comprising the steps of generating randomly recurring pulses at the first transmitting station, generating randomly recurring pulses at the second transmitting station, modulating each pulse at the first transmitting station with first and second groups of frequencies, modulating each pulse at the second transmitting station with third and fourth groups of frequencies, radiating the modulating pulses from the first transmitting station to both of said receiving stations, radiating the modulated pulses from the second transmitting station to both of said receiving stations, checking the receiving pulses at each of said receiving stations for presence of a predetermined number of modulating frequencies and presence of predetermined frequencies in said first and third groups of frequencies, and providing an output code from the first receiving station in accordance with the second group of frequencies when the predetermined number of modulating frequencies and the first group of frequencies are present at the first receiving station, and providing an output code from the second receiving station in accordance with the fourth group of frequencies when the predetermined number of modulating frequencies and the third group of frequencies are present at the second receiving station.

6. A communication system comprising means for generating pulses recurring at random times within periods of predetermined maximum and minimum limits, means keying a transmitter with the output of said generating means, means modulating the transmitter with a first group of frequencies, means modulating the transmitter with a second group of frequencies, means responsive to the output of said transmitter and providing a composite signal containing the first and second groups of modulating frequencies, means recovering the first group of modulating frequencies from the composite signal, means recovering the second group of modulating frequencies from the composite signal, gating means receiving an input signal from said means recovering the second group of modulating frequencies, and means responsive to the presence of said first group of modulating frequencies for controlling said gating means.

7. A communication system comprising means for generating a pulse train of variable pulse repetition rate, means keying a transmitter with the output of said generating means, means modulating the transmitter with a group of address frequencies, means modulating the transmitter with a group of command frequencies, means responsive to the output of said transmitter and providing a composite signal containing the address and command frequencies, means recovering the group of address frequencies from the composite signal, means recovering the group of command frequencies from the composite signal, gating means receiving an input signal from said means recovering the group of command frequencies, and means responsive to the presence of said address and command groups of modulating frequencies for controlling said gating means.

8. In a system for transmitting information from a transmitting station to a receiving station, the combination comprising means selectively producing a first group of frequencies, means selectively producing a second group of frequencies, a transmitter, means coupling both groups of frequencies to the transmitter for modulation thereof, means periodically keying the transmitter at random once within every one of consecutive periods varying in duration between maximum and minimum limits and thereby providing random bursts of modulated carrier signal from the transmitter, means receiving the bursts of modulated carrier signal and providing a composite output signal consisting of the modulating frequencies, means separating the modulating frequencies into said groups of frequencies, gating means opening upon presence of said groups of frequencies applied thereto, means responsive to presence of preselected frequencies in the second group providing a group of input signals to said gating means, and means responsive to presence of preselected frequencies in the first group of frequencies providing a control signal for opening said gating means and thereby coupling the group of input signals therethrough.

9. The communication system of claim 8 having additional means responsive to a change in the second group of frequencies, said responsive means being coupled to the transmitter for keying said transmitter immediately upon a change in the frequencies comprising the second group.

10. In a system for establishing communications on a common carrier frequency; a plurality of transmitting stations, each transmitting station comprising a transmitter, means selectively producing a first group of frequencies, means selectively producing a second group of frequencies, means coupling both said groups of frequencies to the transmitter for modulation thereof, and means periodically keying the transmitter randomly once within every one of consecutive periods varying in duration between maximum and minimum limits, thereby providing a low probability that transmissions from said transmitter will interfere with transmissions from any other transmitter; and a plurality of receiving stations, each receiving station being responsive to a signal transmitted from a different one of said plurality of transmitting stations and comprising receiving means responsive to said carrier signal for providing a composite output signal consisting of the modulating frequencies in the carrier signal, means separating the received modulating frequencies into said first and second groups of frequencies, an AND gate producing an output upon presence of a predetermined number and combination of modulating frequencies applied thereto, means coupling the separating means to the AND gate, gating means, means responsive to presence of preselected frequencies in the second group of frequencies providing a second group of input signals to said gating means, and means coupling the output of said AND gate to said gating means for controlling passage of the group of input signals through said gating means.

11. The means for establishing communications from each of a plurality of transmitting stations to separate receiving stations on a common carrier frequency of claim 10 wherein each transmitting station has additional means responsive to a change in the second group of frequencies, said responsive means being coupled to the transmitter for keying said transmitter immediately upon a change in the frequencies comprising the second group of frequencies.

12. A random burst frequency modulated transmitting station comprising a transmitter, means coupling a plurality of address oscillators to the transmitter for modulating the transmitter in accordance therewith, means coupling a plurality of command oscillators to the transmitter for modulating the transmitter in accordance therewith, means selectively triggering a predetermined group of said command oscillators, means keying the transmitter at a repetition rate varying at random within maximum and minimum limits, and means responsive to the beginning of oscillation of any newly triggered command oscillator at the instant a new group of command oscillators is triggered for keying the transmitter at the instant said oscillation begins.

13. Means for transmitting random bursts of frequency modulated carrier signal comprising a transmitter means selectively producing a first group of modulating frequencies, means selectively producing a second group of modulating frequencies, means coupling both groups of frequencies to the transmitter for modulation therewith, means repeatedly keying the transmitter at random once within every one of consecutive periods varying in duration between maximum and minimum limits, and additional means responsive to a change in composition of the first group of frequencies, said additional responsive means being coupled to the transmitter for keying the transmitter immediately upon said change in composition.

14. A receiving station for receiving and separating information in the form of command and address frequencies comprising a receiver for receiving bursts of carrier signal frequency modulated with said address and command frequencies and demodulating the received signal, means separating the address frequencies from the command frequencies in the demodulated signal, means coupling the address and command frequencies to an AND gate, and means selectively coupling the command frequencies to utilization equipment in accordance with the output of the AND gate, the AND gate comprising a plurality of diodes and a plurality of inverter circuits and additionally comprising means coupling each separate received address frequency to a separate diode, means for detecting unwanted address frequencies in the demodulated signal, means coupling each of said detecting means to a separate inverter, and means responsive to outputs from said diodes and inverters for providing an output signal from said AND gate when all outputs from said diodes and inverters are present.

15. Means for receiving random bursts of frequency modulated carrier signal from a preselected one of a group of transmitting stations operating on a common carrier frequency wherein the modulation includes two groups of frequencies, said means comprising a receiver providing a composite output signal consisting of the modulating frequencies, means separating the modulating frequencies into said groups of frequencies, and gating means responsive to presence of a preselected number of modulating frequencies in said composite signal and presence of preselected frequencies in one of said groups of frequencies for controllably coupling the other of said groups of frequencies therethrough.

16. An AND gate for providing an output signal only when proper signals at the input thereof are present and improper signals at the input thereof are absent comprising, diode means, inverter means, means for detecting presence of predetermined frequencies in a composite signal, means coupling a first group of said detecting means to said diode means, means coupling a second group of said detecting means to said inverter means, and means coupling outputs from said diode means and inverter means to a common conductor for enabling said conductor to provide an output voltage only upon presence of output signals from said first group of detecting means and absence of output signals from said second group of detecting means.

17. A communication system comprising means for generating pulses recurring at random times within periods of predetermined maximum and minimum limits, means keying a transmitter with the output of said generating means, means modulating the transmitter with a first group of frequencies, means modulating the transmitter with a second group of frequencies, means responsive to the output of said transmitter and providing a composite signal containing the first and second groups of modulating frequencies, means recovering the first group of modulating frequencies from the composite signal, means recovering the second group of modulating frequencies from the composite signal, first gating means receiving an input signal from said means recovering the second group of modulating frequencies, means responsive to said means recovering the first group of modulating frequencies for controlling said first gating means, pulse responsive means coupled to said means recovering the first group of modulating frequencies and providing an output so long as pulses are received consecutively within said periods of predetermined maximum and minimum limits, utilization means, and second gating means coupling said first gating means to said utilization means in response to the condition of said pulse responsive means.

18. A method of transmitting information from a first transmitting station to a first receiving station and from a second transmitting station to a second receiving station simultaneously on a single carrier frequency without interference, comprising the steps of generating pulses recurring according to a first pattern at the first transmitting station, generating pulses recurring according to a second pattern at the second transmitting station, modulating each pulse generated at the first transmitting station with first and second groups of frequencies, modulating each pulse generated at the second transmitting station with third and fourth groups of frequencies, radiating the modulated pulses from the first transmitting station to both of said receiving stations, radiating the modulated pulses from the second transmitting station to both of said receiving stations, checking the received pulses at each of said receiving stations for presence of predetermined frequencies in said first and third groups of frequencies, providing an output code from the first receiving station in accordance with the second group of frequencies when the first group of frequencies is present at the first receiving station, and providing an output code from the second receiving station in accordance with the fourth group of frequencies when the third group of frequencies is present at the second receiving station.

19. A method of transmitting information from a first transmitting station to a first receiving station and from a second transmitting station to a second receiving station simultaneously on a single carrier frequency without interference, comprising the steps of generating pulses recurring according to a first pattern at the first transmitting station, generating pulses recurring according to a second pattern at the second transmitting station, modulating each pulse generated at the first transmitting station with first and second groups of frequencies, modulating each pulse generated at the second transmitting station with third and fourth groups of frequencies, radiating the modulated pulses from the first transmitting station to both of said receiving stations, radiating the modulated pulses from the second transmitting station to both of said receiving stations, checking the received pulses at each of said receiving stations for presence of a predetermined number of modulating frequencies and presence of predetermined frequencies in said first and third groups of frequencies, providing an output code from the first receiving station in accordance with the second group of frequencies when the predetermined number of modulating frequencies and the first group of frequencies are present at the first receiving station, and providing an output code from the second receiving station in accordance with the fourth group of frequencies when the predetermined number of modulating frequencies and the third group of frequencies are present at the second receiving station.

References Cited

UNITED STATES PATENTS

| | | | |
|---|---|---|---|
| 2,701,305 | 2/1955 | Hopper | 179—15 X |
| 2,705,321 | 3/1955 | Beck et al. | 325—37 X |
| 2,719,188 | 9/1955 | Pierce | 179—15 X |
| 3,049,676 | 8/1962 | Zinke | 331—78 |
| 2,513,342 | 7/1950 | Marshall | 340—171 |
| 3,160,711 | 12/1964 | Schroeder. | |
| 3,197,563 | 7/1965 | Hamsher et al. | |
| 3,239,761 | 3/1966 | Goode. | |

ROBERT L. GRIFFIN, Primary Examiner

BENEDICT V. SAFOUREK, Assistant Examiner

U.S. Cl. X.R.

325—37, 55; 340—171